(12) United States Patent
Powell

(10) Patent No.: US 10,494,771 B1
(45) Date of Patent: Dec. 3, 2019

(54) PRECAST PARK REFUGE CONSTRUCTION METHOD AND APPARATUS

(71) Applicant: David W. Powell, Austin, TX (US)

(72) Inventor: David W. Powell, Austin, TX (US)

(*) Notice: Subject to any disclaimer, the term of this patent is extended or adjusted under 35 U.S.C. 154(b) by 0 days.

(21) Appl. No.: 15/940,933

(22) Filed: Mar. 29, 2018

Related U.S. Application Data

(60) Provisional application No. 62/478,083, filed on Mar. 29, 2017.

(51) Int. Cl.
*A63C 19/10* (2006.01)
*E01C 13/00* (2006.01)
*E04B 1/02* (2006.01)

(52) U.S. Cl.
CPC .......... *E01C 13/003* (2013.01); *A63C 19/10* (2013.01); *E04B 1/02* (2013.01)

(58) Field of Classification Search
CPC ......... A63C 19/00; A63C 19/02; A63C 19/10; A63B 69/0022; A63B 2069/167
USPC ............... 472/88–94, 136; 14/69.5, 71.1
See application file for complete search history.

(56) References Cited

U.S. PATENT DOCUMENTS

| | | | | |
|---|---|---|---|---|
| 4,971,314 A | * | 11/1990 | Barber | A63G 25/00 104/69 |
| 5,033,146 A | * | 7/1991 | Fogarty | B60S 13/00 14/69.5 |
| 5,524,310 A | * | 6/1996 | Farnen | A63C 19/10 14/69.5 |
| 6,126,551 A | * | 10/2000 | Martin | A63C 19/10 472/90 |
| 6,676,529 B2 | * | 1/2004 | Pernal | A63C 19/10 472/89 |

* cited by examiner

*Primary Examiner* — Kien T Nguyen
(74) *Attorney, Agent, or Firm* — Rick B. Yeager

(57) ABSTRACT

A building system comprising a combination of precast or prefabricated structural elements to serve as skate parks, swimming pools, or community gathering places; and to provide refuge such as tornado shelters. Precast or pre-manufactured modular cells have an open bottom, a first and second side wall, a rear wall, and a functional top surface. The functional top surfaces of the modules include an inclined or curved surface. When combined, the top surfaces form useful areas such as a skate park, swimming pool, or amphitheater seating. Sleeves, keys, and other features facilitate the assembly of the modules. A cast slab may be poured after assembly; or the modules may be secured to a slab. Example modules include a Flat Ramp Block, a Circular Ramp Block, and a Circular Bowl Block, a stair block, and a ledge block.

14 Claims, 17 Drawing Sheets

US 10,494,771 B1

PRECAST PARK REFUGE CONSTRUCTION METHOD AND APPARATUS

RELATED APPLICATIONS

This US Non-Provisional application is related to U.S. Provisional Application No. 62/478,083 filed Mar. 29, 2017 by applicant, and claims the priority date of that application.

BACKGROUND

Field of Invention

This invention is related to a building system comprising a combination of precast structural elements.

It was inspired by reading a firsthand account of a young father who huddled with his pregnant wife and three kids in the center hall of their mobile home as a tornado ripped it apart around them. Residents in trailer park communities are completely exposed in a tornado. Broadcast tornado warnings commonly advise mobile home residents to leave their homes and take shelter in a ditch or low lying area. A solution is obviously needed for trailer park residents, but a tornado can reduce even a conventionally built home to a debris field of bricks and splintered wood. Communities that lie in a tornado prone area will be well served by having built places of refuge that are engineered for survival.

In one embodiment, this invention extends applicant's LadderBlock™ precision precast building technologies to a structural type that serves two distinctly different purposes. For a tiny fraction of a percent of their service lives, these structures will serve their primary role—as a life saving place of refuge during a tornado. But these are not the concrete boxes of old that are planted in the ground. These concrete building blocks will spend the vast majority of their service life as skate parks, swimming pools, and community gathering places—providing healthy and active entertainment for the residents that live around them.

Description of Related Art

The current state of the art in storm shelter construction generally consists of steel or reinforced concrete box or tube structures that are intended to be buried below the ground surface. The costs of these structures and the excavation required to install them make such a solution unattainable for most people. The current state of the art in skate park construction generally consists of site formed and cast reinforced concrete slabs, ramps, bowls and walls; swimming pool construction is similar. The costs of this construction are many times over the cost of a flat slab of the same area; it is the cost of the vertical and contoured concrete construction in place that drives that multiplier. It is labor intensive work that is subject to the weather, so it is slow and expensive.

SUMMARY

This invention, by virtue of the economies associated with designing, manufacturing and assembling a system of modular building blocks, will provide skate park, community space, and pool construction that is cost competitive with conventional practice. But below the decks, these structures will lead a second life that provides much greater value. While providing daily entertainment and community building value, they will be on constant standby—ready to provide a place of emergency refuge for scores of people that would otherwise have no safe place to go.

DETAILED DESCRIPTION OF THE DRAWINGS

In this specification and claims, the term "precast" refers to any prefabricated module including, but not limited to, precast concrete modules; modules assembled from cast wall and ceiling panels; modules fabricated from panels of wood, composite, or other materials; and modules otherwise constructed at or remote from a job site.

In this specification and claims, the term "functional top surface" refers to a profile provided on the top surface of a module that is configured to serve a purpose beyond sheltering the interior of the module. Examples of functional top surface include, but are not limited to inclines or curved surfaces for skateboarding; curved or ledge pool supports, seating, and steps. The initial set of building blocks that are described in this embodiment of the invention are designed to conform with the LadderBlock standard dimensional module so they can be transported without a permit and supported on a LadderBlock open frame structure, but similar solutions of other dimensions are clearly possible.

Basic Block Features

Figure 1:
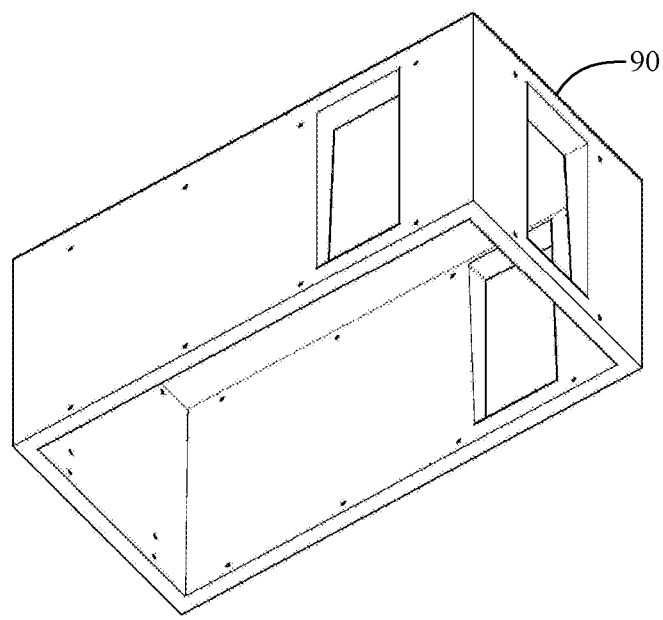
FIG. 1 is a bottom isometric view of a first example precast refuge cell.

The most basic description of these building blocks is that of a reinforced concrete box 90 that is inverted so that the floor of the box becomes the precast roof of a protected space or refuge cellas shown in FIG. 1. The walls of this embodiment are shown tapered; this is for ease of internal form removal, and to intentionally thicken and toughen the wall and roof structure. Three vertical exterior walls of the box each offer a potential passage opening or doorway, and alignment and connection sleeves are cast into each block. But the typical building block of this invention is not a simple box. One edge or corner of the box typically forms a functional profile that enables the structure to serve multiple purposes.

Figure 2:
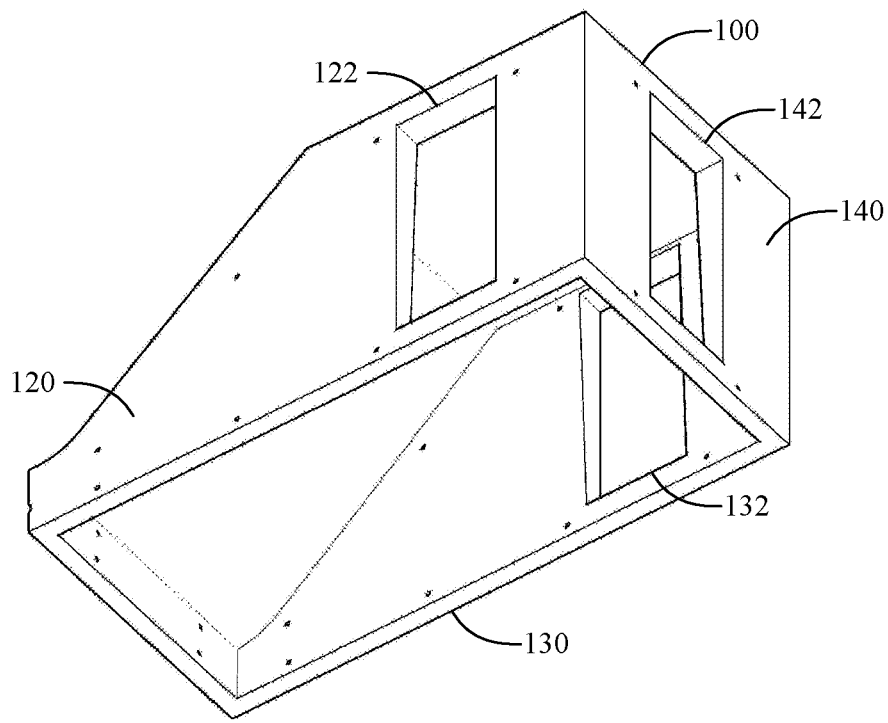
FIG. 2 is a an isometric view looking upward into the refuge cell of FIG. 1 where the top surface has a functional profile.

FIG. 2 is an isometric view looking upward into an example refuge cell 100 having an open bottom, a first side wall 120, a second side wall 130, a rear wall 140, and a functional top surface 110. In this example, access openings 122, 132, and 142 are shown in the side and rear walls.

Figure 3:
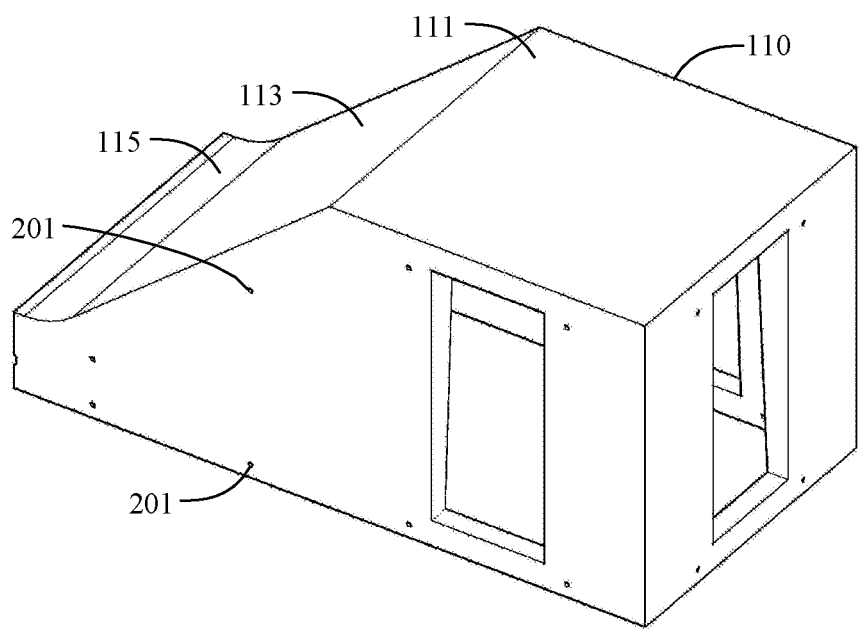
FIG. 3 is a an isometric view looking downward into the refuge cell of FIG. 2.

FIG. 3 is a downward looking isometric view of the same building block. The precisely located sleeves 201 near the base and top of each block enable the alignment and assembly of multiple precast components with precision. In this example, the functional top surface 110 includes a flat portion 111, a first inclined surface 113, and a lower curved surface 115.

Figure 4:
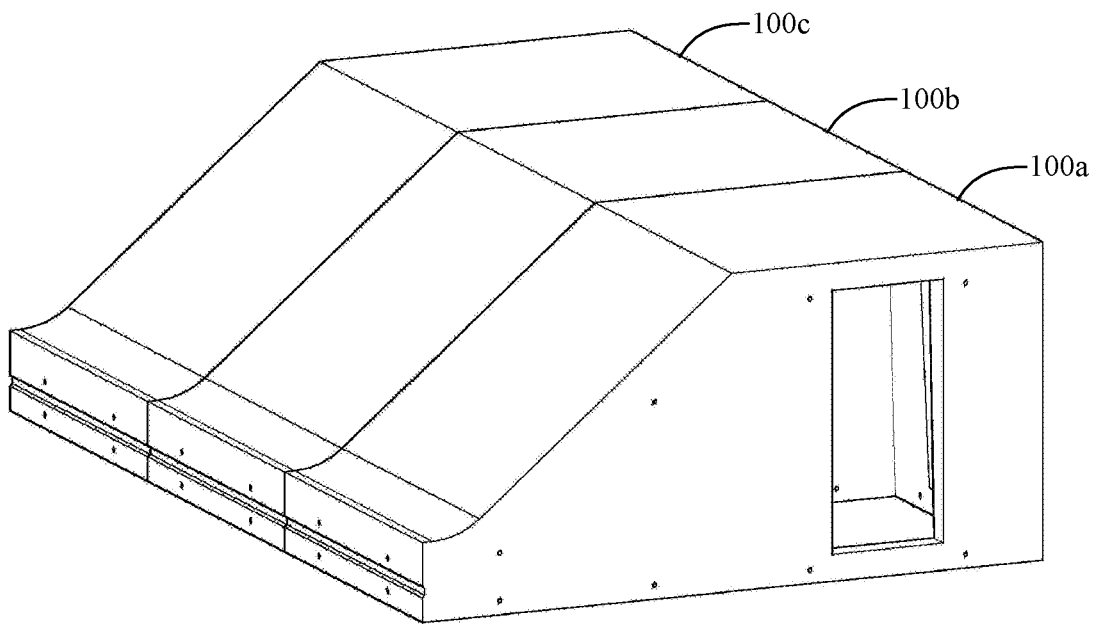
FIG. 4 is a perspective view of an example structure formed by combining three refuge cells of the design of FIG. 2.
Figure 5:
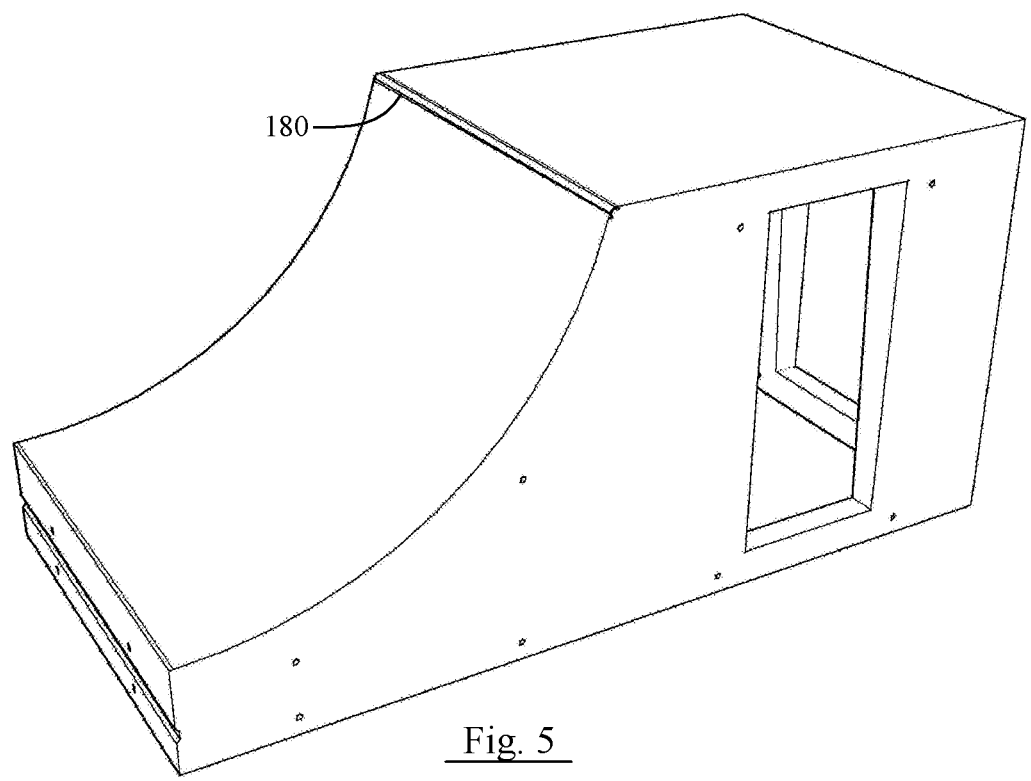
FIG. 5 is a perspective view of a second example precast refuge cell with a curved upper surface and embedded edge elements.

That precision enables a composite structure formed of multiple building blocks to build a surface that is smooth enough to be skated or biked on, or one that can contain a pool of water. FIG. 4 shows an assembly of three blocks 100a, 100b, and 100c so that the combined top surfaces are configured to serve as a portion of a skate park.

Where an edge of a block is expected to be subject to skaters and BMX riders "grinding" metal against the skate surface, steel pipe edge coping embeds 180 can be installed in the forms prior to precasting the blocks as shown in FIG. 5.

Figure 6:
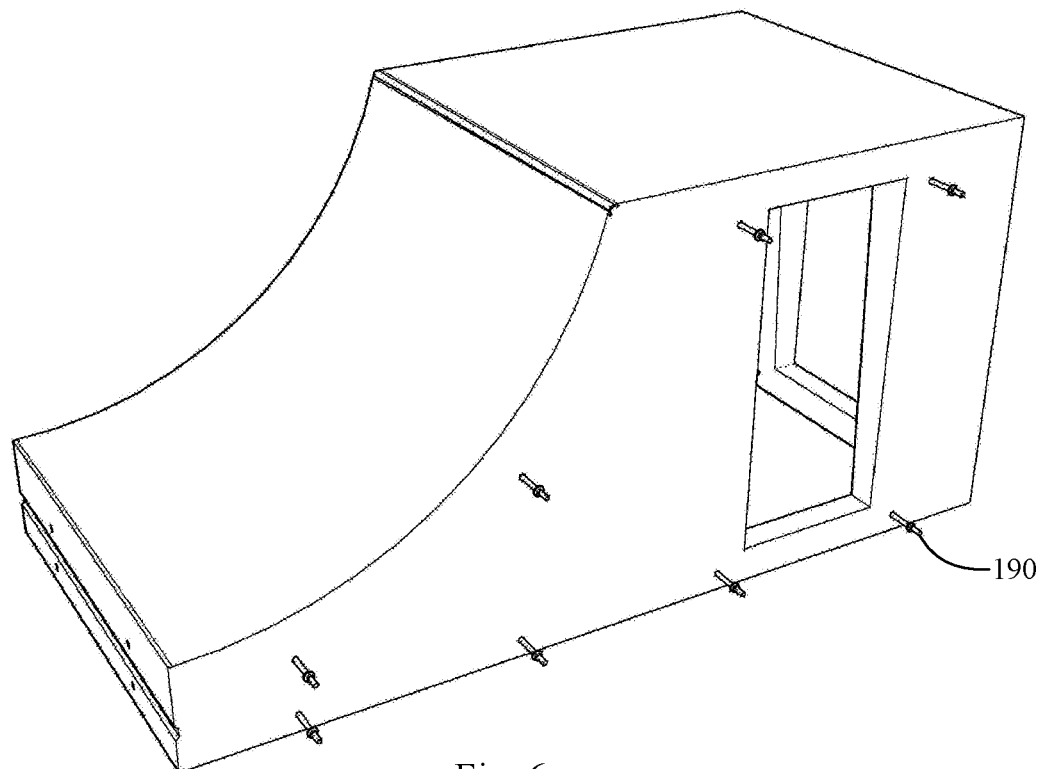
FIG. 6 is a perspective view of the second example precast refuge cell of FIG. 5 with integral bolts cast into a side wall.

Connections between blocks can be made by way of simple bolts or threaded rods 190 as shown in FIG. 6.

Figure 7:
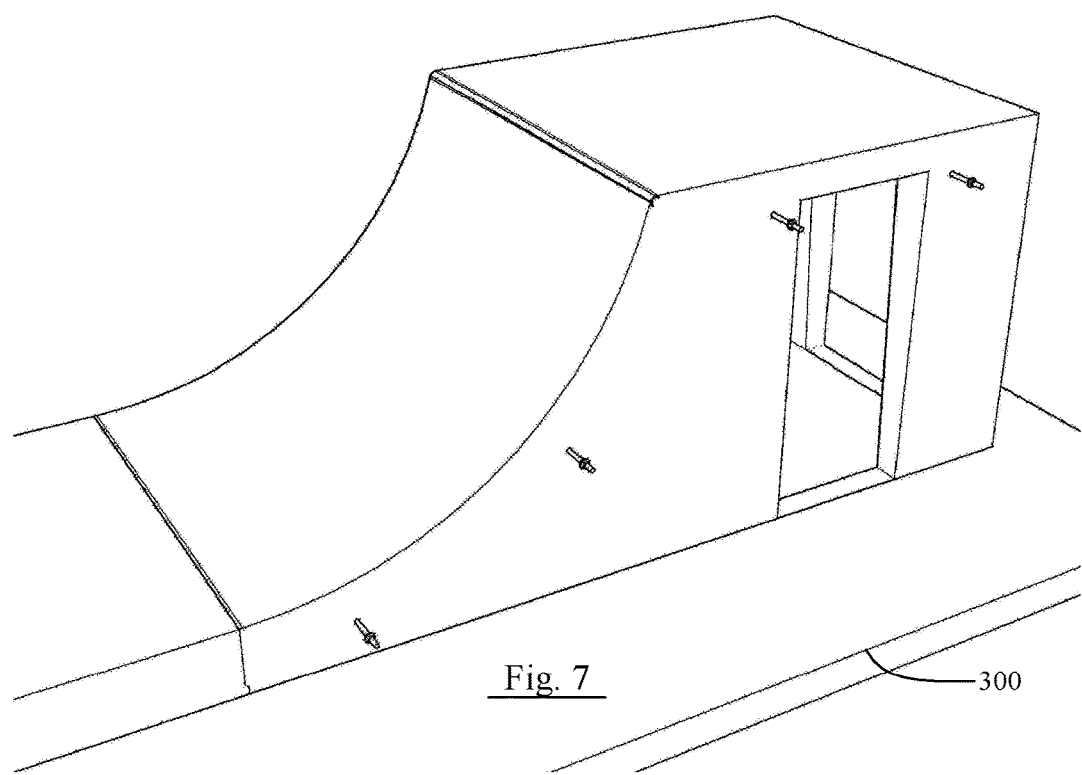
FIG. 7 is a perspective view of the second example precast refuge cell of FIG. 6 integrally linked to a cast in place concrete ground slab.

Assembled block sets may be integrally linked to a cast in place concrete ground slab 300 as shown in FIG. 7 and described below.

Figure 8:
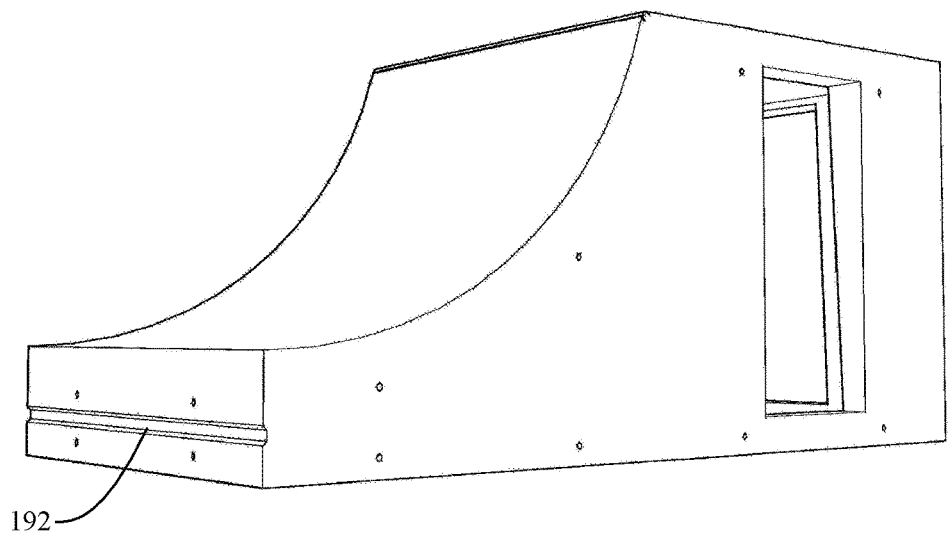
FIG. 8 is a perspective view of the second example precast refuge cell of FIG. 5 with shear keys cast into a front and side face.

Continuous shear keys 192 can be cast into selected faces as shown in FIG. 8 to help maintain the relative alignment of blocks and the ground slabs that are cast against them.

Figure 9:
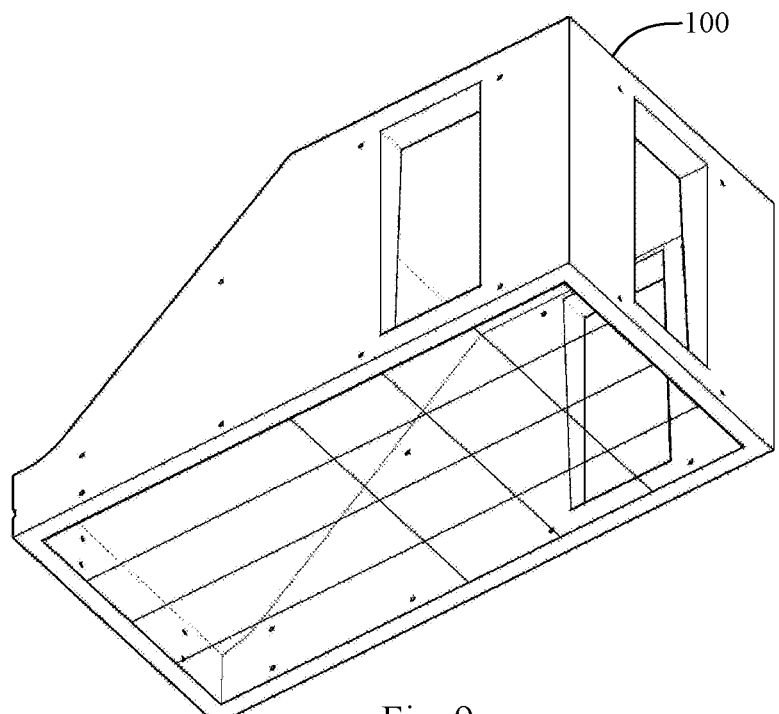
FIG. 9 is an isometric view of the second example precast refuge cell of FIG. 8.

The most vital feature of these building blocks is their refuge capacity. The block shown can easily accommodate sixteen persons as shown in FIG. 9: twelve that are based on an emergency occupancy of 5 square feet per person, plus low head room spaces of over 15 square feet each that can accommodate at least an additional four persons in either sitting or fully reclined positions.

Initial Block Types

Figure 10:
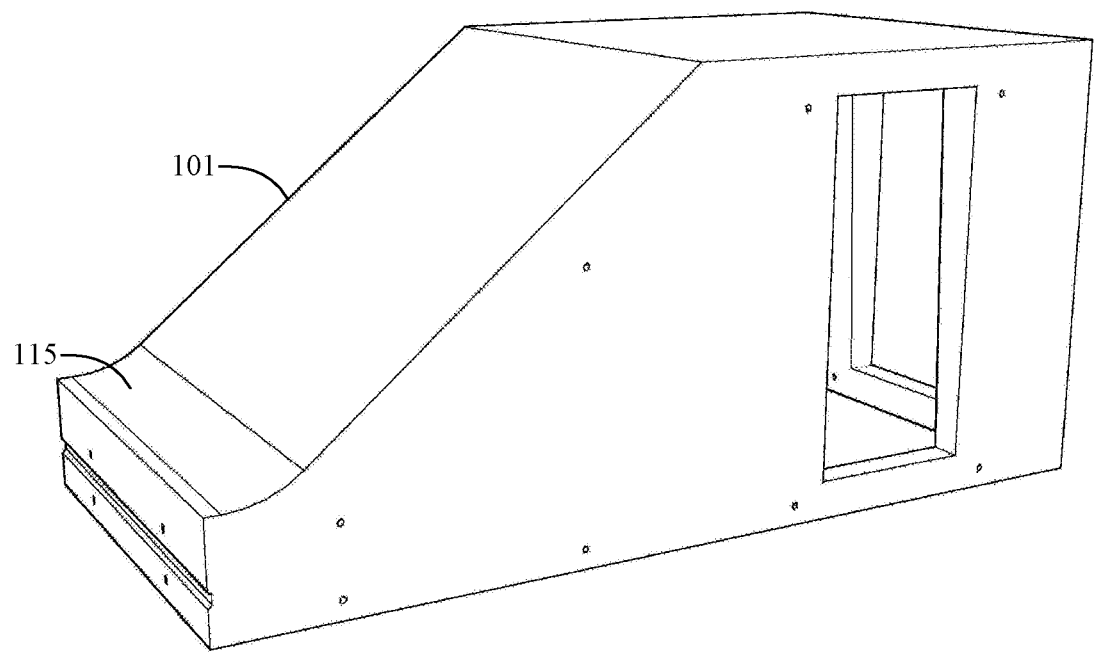
FIG. 10 is a side perspective view of an example flat ramp block.
Figure 11:
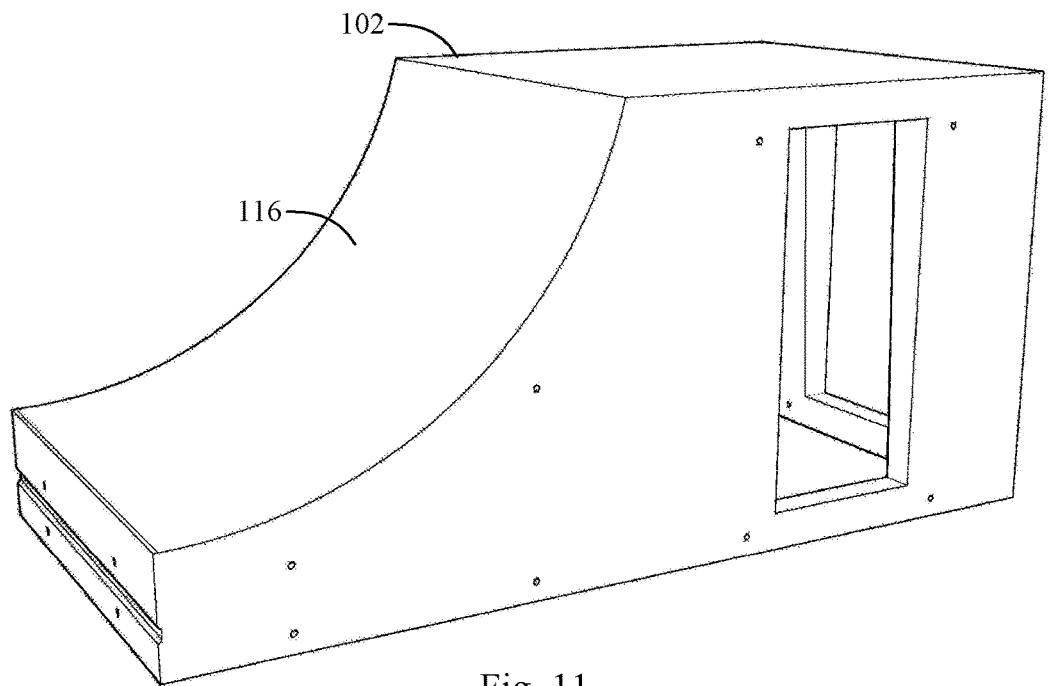
FIG. 11 is a side perspective view of an example circular ramp block.
Figure 12:
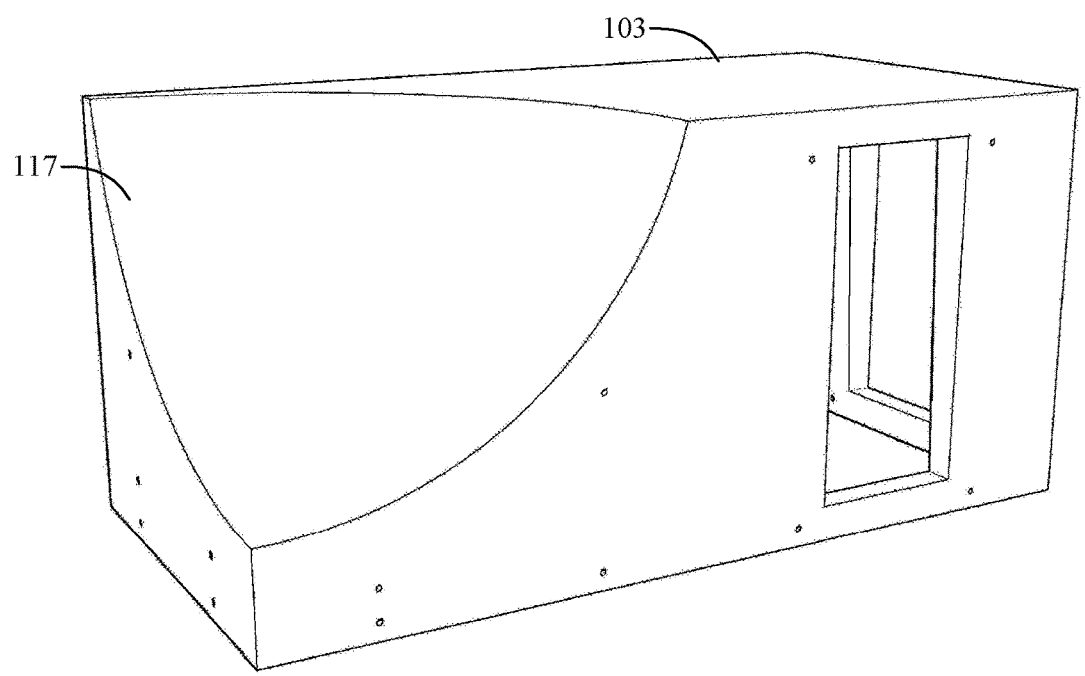
FIG. 12 is a side perspective view of an example circular bowl block.
Figure 13:
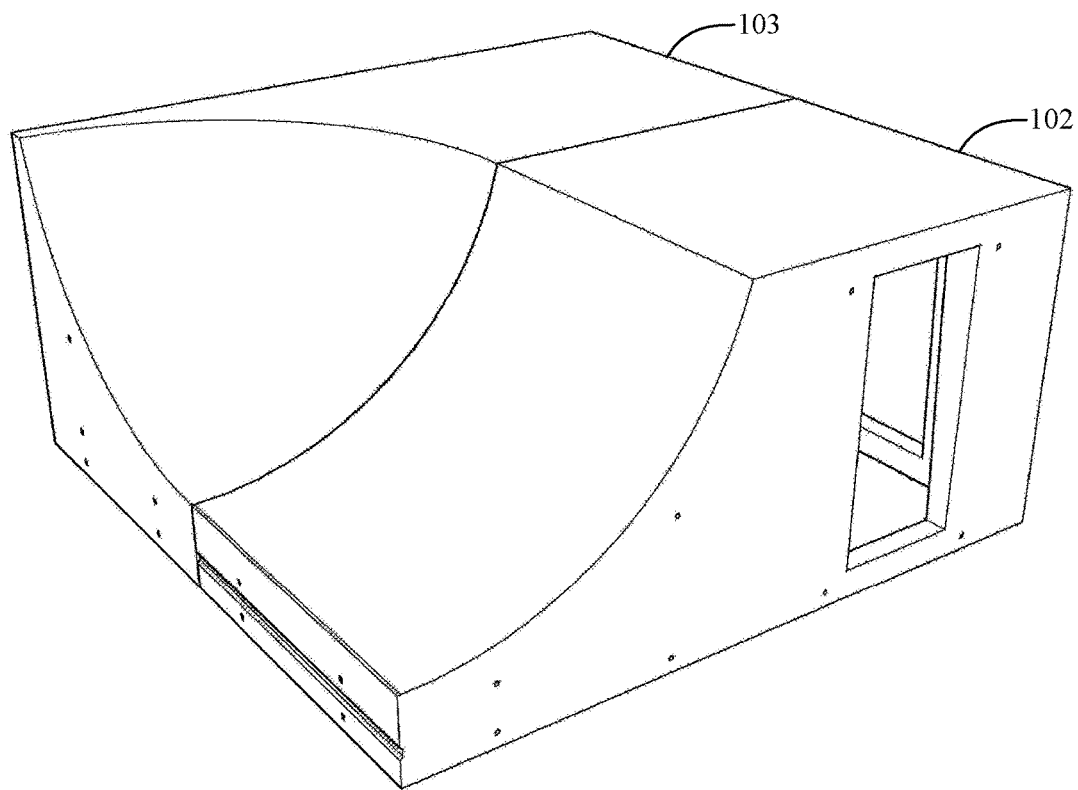
FIG. 13 is a side perspective view of a circular bowl block of FIG. 12 assembled side to side with a circular ramp block of FIG. 11.

Consider an initial set of just three basic block types: a Flat Ramp Block, a Circular Ramp Block, and a Circular Bowl Block. The Flat Ramp Block 101 of FIG. 10 has a curved region 115 at the base to provide a smooth transition from the base of the ramp to the flat slab that will be cast against it. The Circular Ramp Block 102 of FIG. 11 is just a curved variant 116 of the flat ramp, and the Circular Bowl Block 103 of FIG. 12 translates that curvature 117 though a ninety degree corner transition. The Circular Ramp Block and the Circular Bowl Block demonstrate how geometries that are coordinated between two adjacent blocks 102 and 103 can produce a composite geometry of FIG. 13 that translates from one block to the next. Obvious variations could coordinate geometries over multiple blocks to build long, low slope ramps or a composite surface that steps, undulates, or varies in almost any way imaginable.

Assembly Examples

Figure 14:
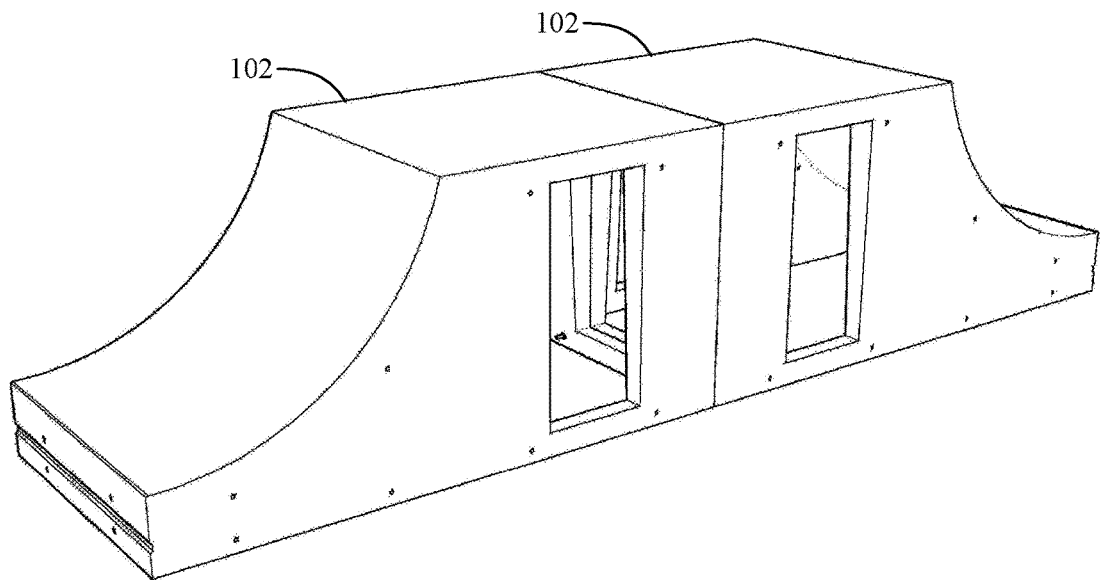
FIG. 14 is a side perspective view of a circular ramp block of FIG. 11 assembled side to side with another circular ramp block of FIG. 11.
Figure 15:
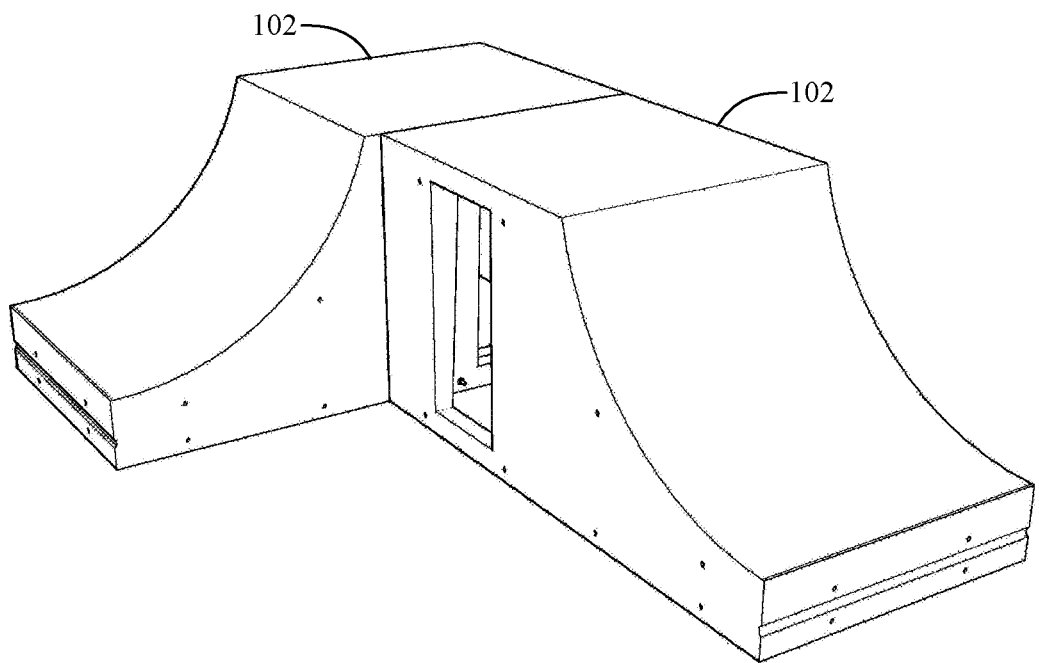
FIG. 15 is a perspective view of a circular ramp block of FIG. 11 assembled perpendicular to another circular ramp block of FIG. 11.
Figure 16:
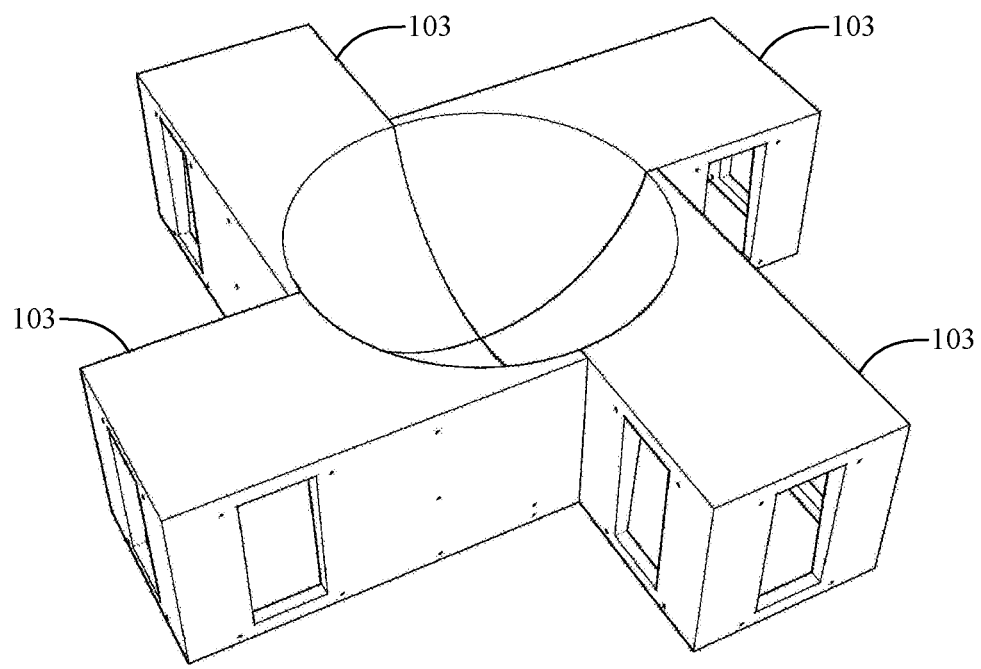
FIG. 16 is a top perspective view of an assembly of four circular bowl blocks of FIG. 12.
Figure 17:
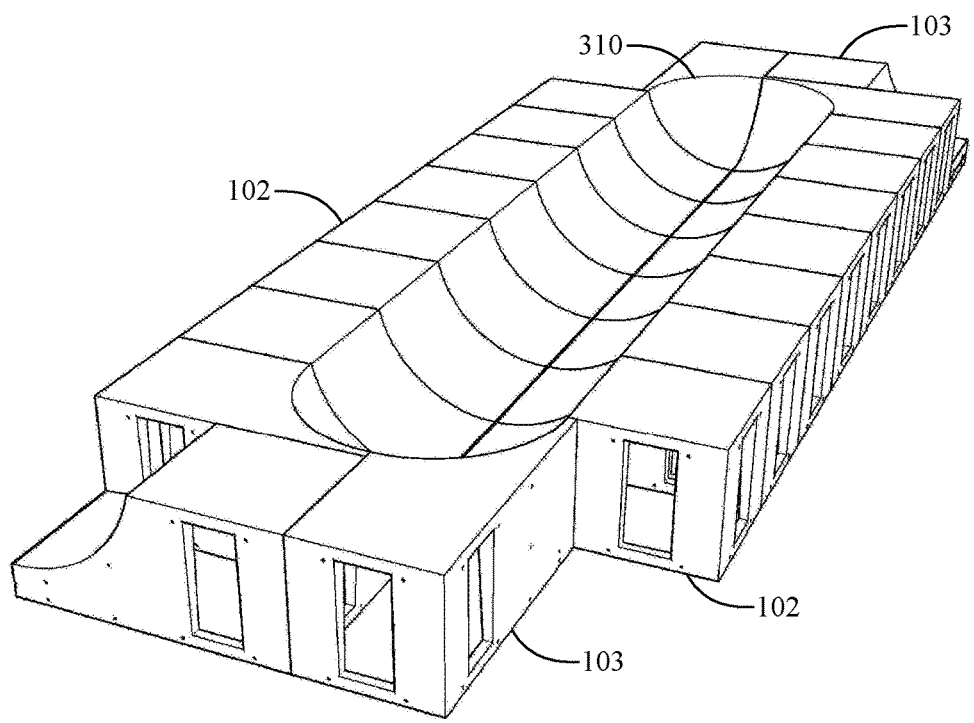
FIG. 17 is a top perspective view of an assembly of a plurality of circular bowl blocks and circular ramp blocks.
Figure 18:
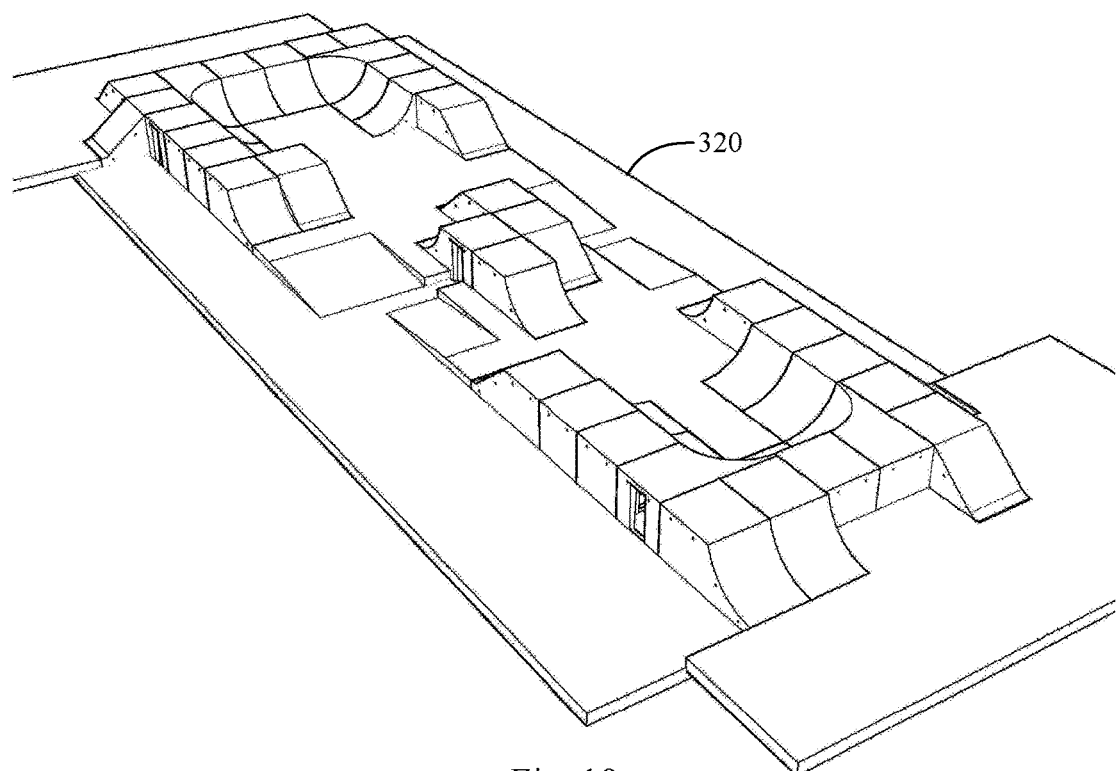
FIG. 18 is a top perspective view of an example skate park and refuge facility formed by the assembly of a plurality of circular bowl blocks and circular ramp blocks.
Figure 19:
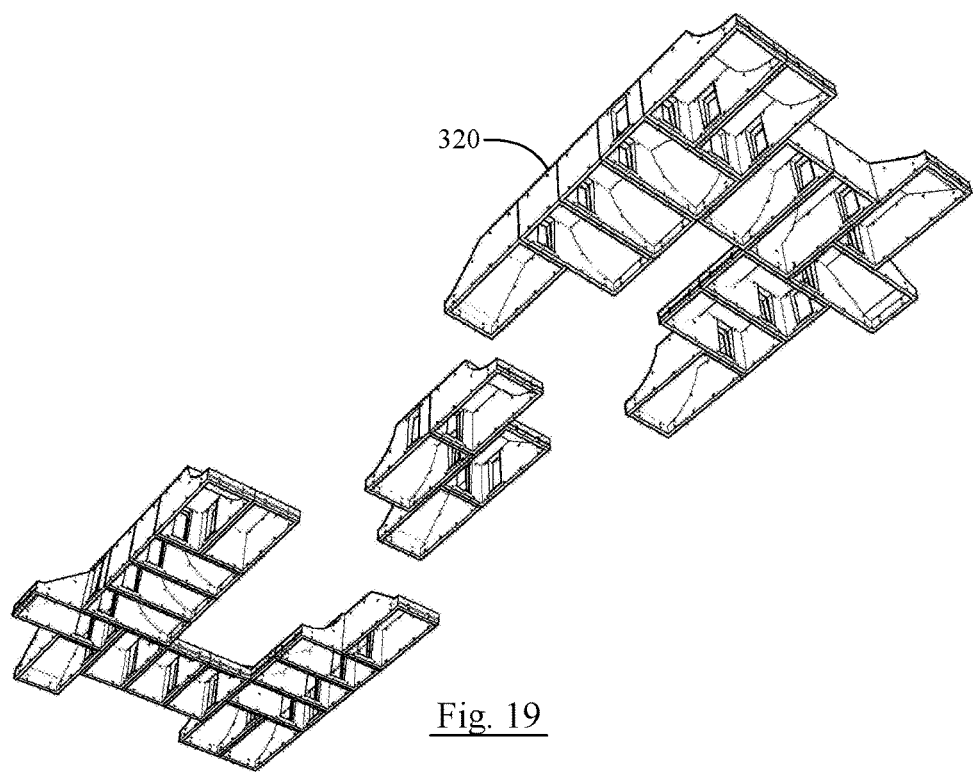
FIG. 19 is a cutaway view looking upward into the configuration of FIG. 18.

These three initial block types can be combined in a variety of ways. Blocks and can be bolted up side by side FIG. 13, end to end (FIG. 14), or perpendicular to one another (FIG. 15). They can be interconnected to form a round bowl (FIG. 16), an extended pool 310 (FIG. 17), or an unlimited variety of skate park configurations 320 such as FIG. 18. At sixteen persons per block, the 33 block configuration of FIG. 18 provides refuge space for 528 people. FIG. 19 is a view looking upward into the configuration of FIG. 18, as though the ground, foundations and ground slab have been removed from the view. It demonstrates how the passage openings in each block align with adjacent blocks to form an interconnected set of individually reinforced refuge cells, like catacombs for the living. In general, every interconnected set of refuge cells has two or more separate exits—to provide an alternate way out if post-storm debris should block an exit. The passage openings are omitted at other exterior walls of each block, so that those walls present a solid concrete barrier between the occupants and the elements. The omitted passage openings will generally be replaced with much smaller exterior wall penetrations that are engineered to ventilate the refuge space. Vents may consist of screened louvers or fans; these elements will either be rated for projectile impact or protected by an external grating structure.

Installation

Figure 20:
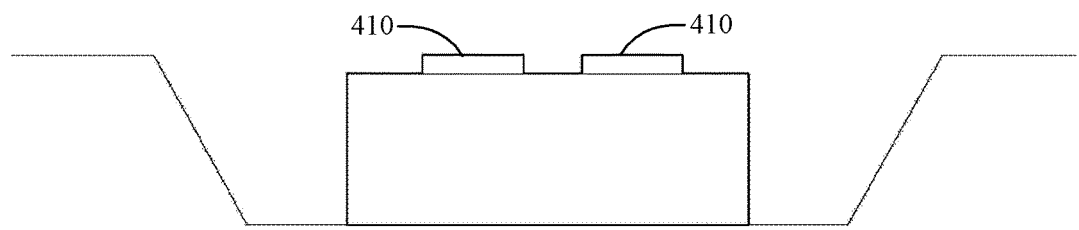
FIG. 20 is a side view of an example shim stack.
Figure 21:
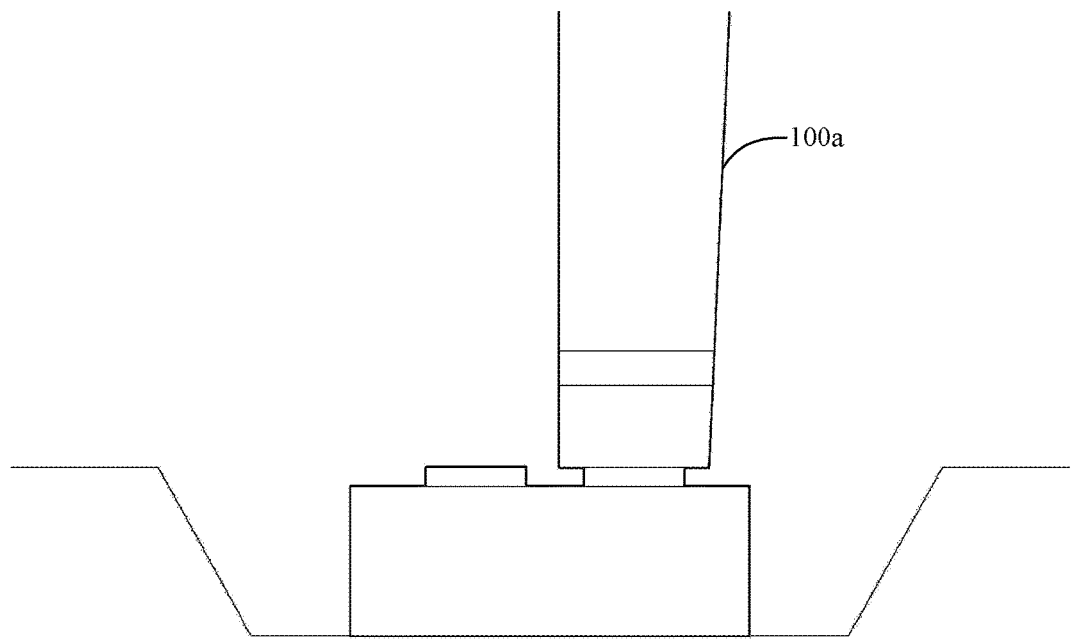
FIG. 21 is a side view of a first precast block set in place on the example shim stack of FIG. 20.
Figure 22:
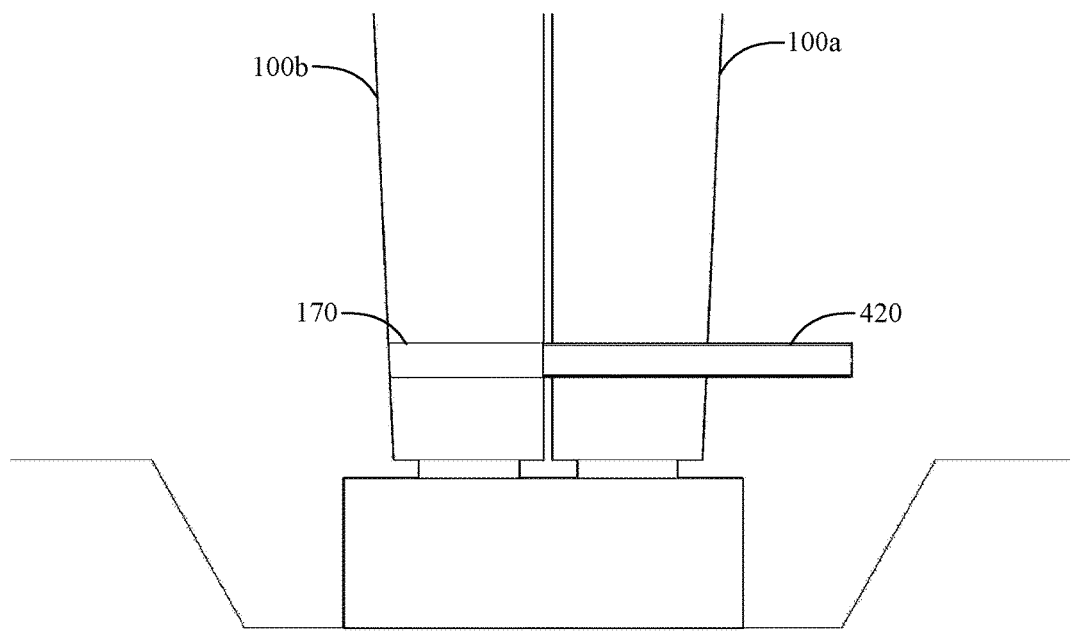
FIG. 22 is a side view of a second precast block set in place on the example shim stack of FIG. 21.
Figure 23:
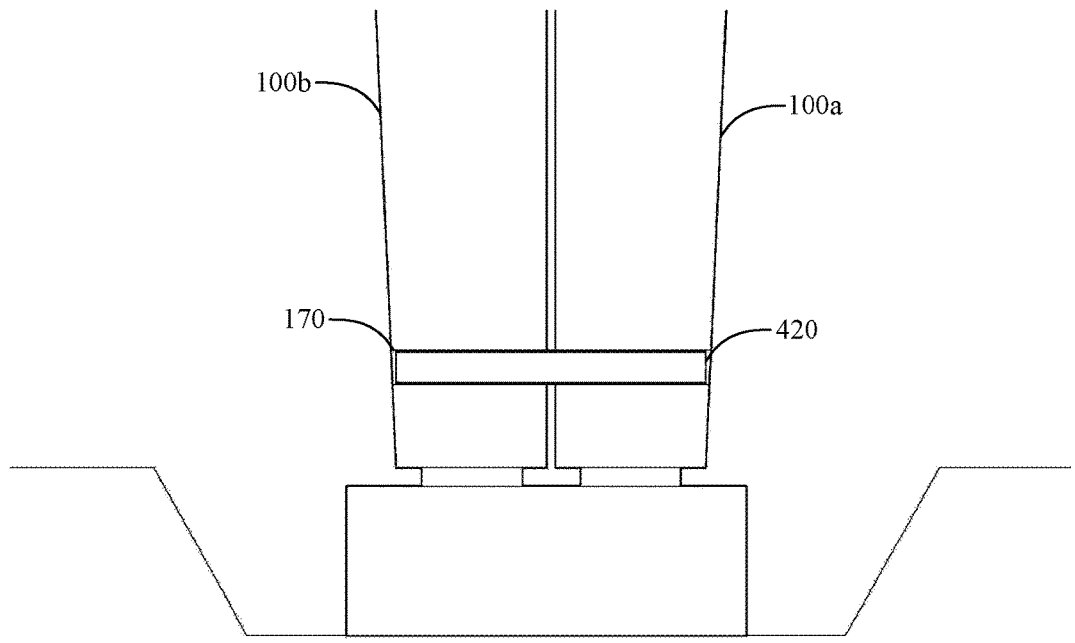
FIG. 23 is a side view of a centering pipe aligning the first and second precast blocks of FIG. 22.
Figure 24:
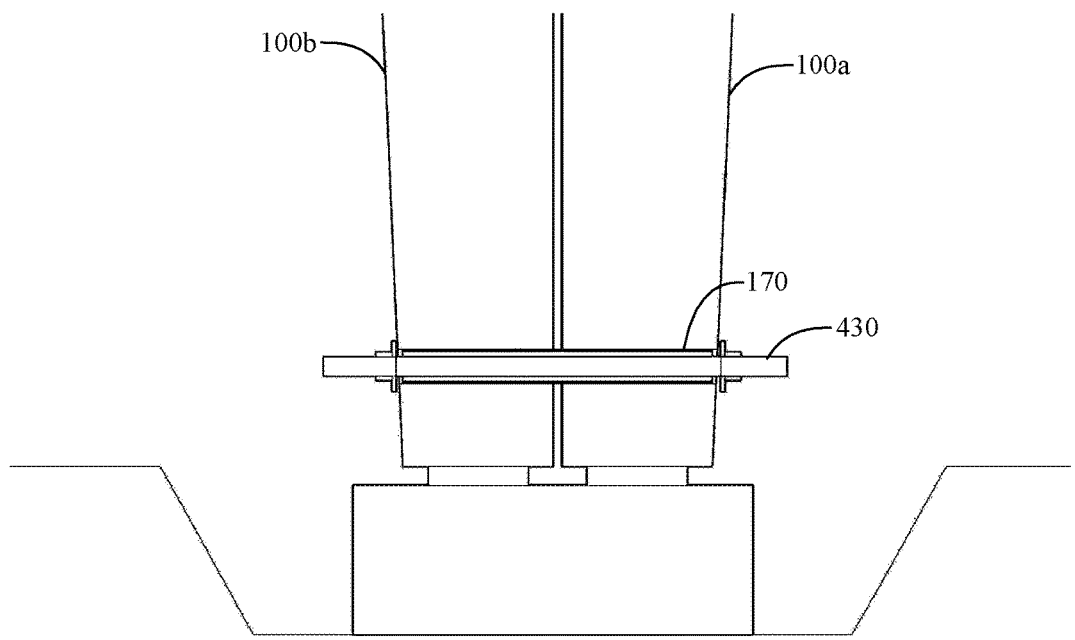
FIG. 24 is a cross section side view of a threaded rod positioned in the centering pipe aligning of FIG. 23.

The process of installing LadderBlock Park Refuge blocks is straight forward. Ground preparation and foundation construction are based on an analysis of the underlying soils at the site. A structural analysis for resistance to impact loads and wind pressures based on design wind speeds and exposure conditions determines the block reinforcement, connection detailing, and slab thickness. If the dead weight of the ground slab plus the precast blocks is not sufficient to resist the design uplift pressures, concrete or helical piers or other tie down mechanisms can be employed. Whether on piers, footings, or simple setting blocks, the supporting surfaces are brought to level with common shim stacks 410 (FIG. 20) and then the first precast block 100*a* is set in place (FIG. 21). As the second block 100*b* at a joint is being hoisted into position, centering pipes 420 (FIG. 22) are installed into the selected precast sleeves 170 to drive the relative alignment of the two blocks (FIG. 23) before slackening the hoisting lines, and then threaded rods 430 (FIG. 24) are used to bolt the blocks together.

Figure 25:
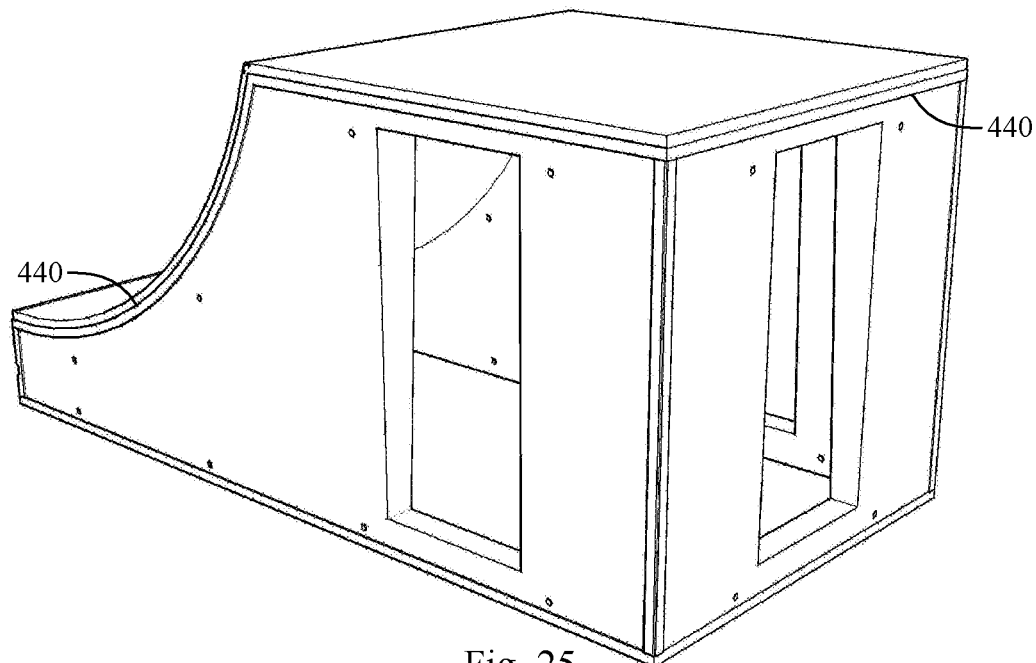
FIG. 25 is a rear perspective view of an example precast cell with compressible bumper pads.
Figure 26:
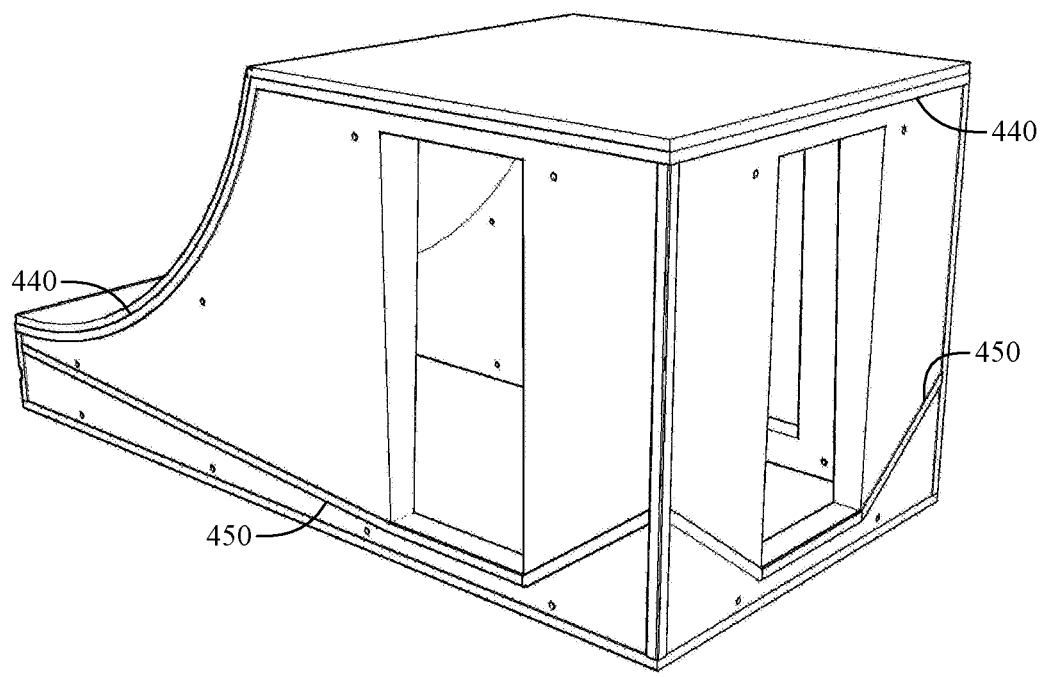
FIG. 26 is a rear perspective view of an example precast cell of FIG. 25 with secondary seal lines.

Bolted connections are generally across a joint that includes compressible bumper pads 440 (FIG. 25) that are adhered to each block prior to setting. These protect the precast parts from impact damage during erection, and they serve as a gasket in the bolted connection between the erected blocks. In the example embodiment, these bumper pads are in the form of strips of material that are positioned to also serve as the stop for a continuous joint sealant line—generally backer rod and commercial grade caulk or sealant, although other joint and waterstop details can be incorporated where required.

Where a belt and suspenders approach to waterproofing is desired, strategically placed secondary seal lines 450 (FIG. 26) can capture any water than makes it through a failed primary joint, carry it along a sloped path to discharge at an interior doorway—as an obvious signal that maintenance is required—and then discharged the leakage to a nearby floor drain.

Because of the generally small dimensions of each precast block and the subsequently small amount of thermal movement that can accumulate at any given joint, the joints can be made narrow and filled in a manner that provides a smooth, waterproof surface that is suitable for a skate park or a swimming pool.

Figure 27:
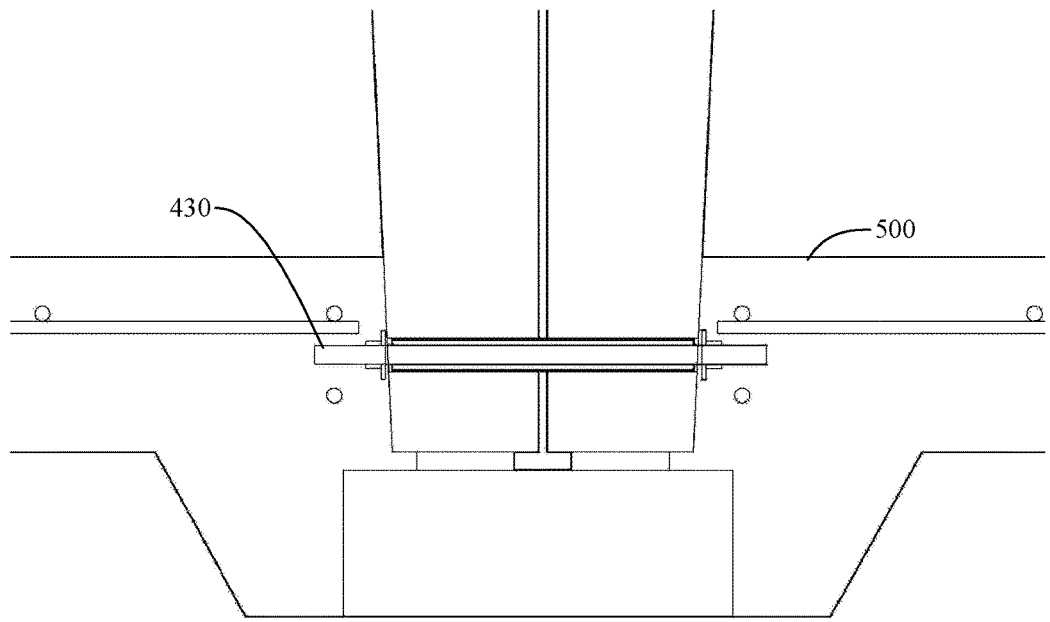
FIG. 27 is is a cross section side view of the assembly of FIG. 24 where extensions of the steel connector rod serve as shear studs within a cast slab.

With the exterior joints sealed, a reinforced ground slab is generally cast to form the remainder of the skate park or pool surfaces, as well as to form floors within each refuge cell below the deck. At sites where the potential for ground surface flooding exists, slabs within the refuge cells are provided with a system of floor drains. External slab perimeter edges are provided with downturned beams that bury the edge below the ground surface—this is to prevent undercutting and uplift of the slab edge in a tornado. Connectivity between the precast blocks and the slabs include concrete bond plus the extensions of the steel connector rods 430 that serve as shear studs within the cast slab 500 (FIG. 27). Precast blocks can also be detailed to include rebar dowels or studs that extend from the precast element into the site cast slab, should structural analysis dictate the need for additional connection capacity.

Figure 28:
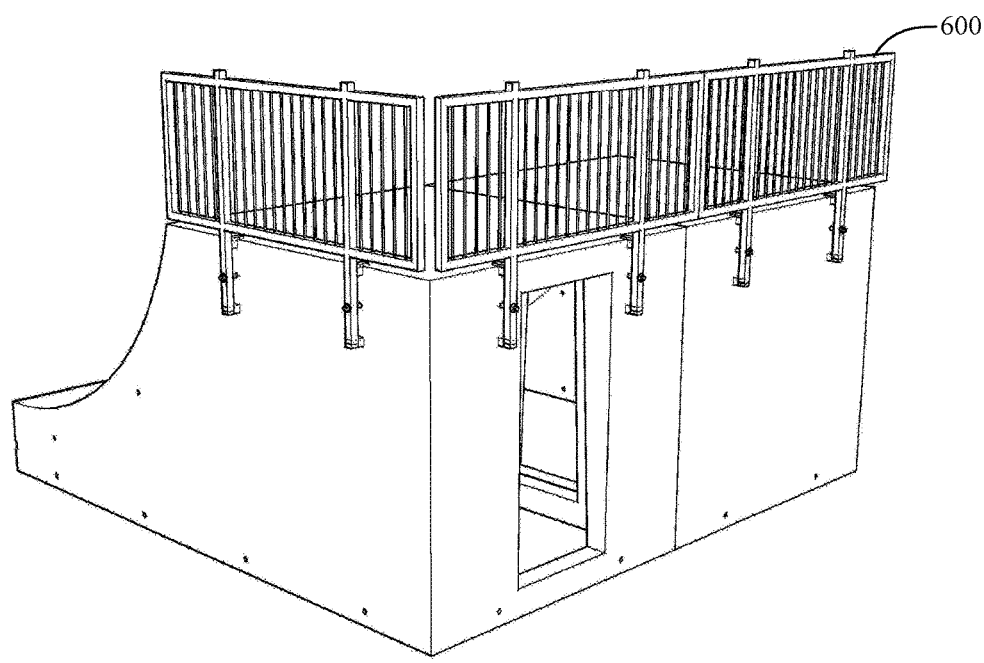
FIG. 28 is a rear perspective view of a precast assembly with modular rail sections.

The upper lines of sleeves at the perimeter of each block are available for the easy connection of modular railing sections 600 to provide fall protection at vertical faces (FIG. 28). The need for fall protection can be eliminated at selected locations by first waterproofing the exterior face of a vertical wall and then using landscaping terraces or berms to build up soil or flatwork to a safe level below the top surface of the block. This strategy also reduces the wind exposure and increases the refuge structure's resilience in a tornado.

Finish Out Features

These structures could be finished out and utilized in any number of ways, but a set of representative features for the example embodiment are described here to demonstrate the intended functionality of the invention.

At each of the redundant exits from each set of interconnected refuge cells, a reinforced storm door is provided. In the example embodiment, the opening of any door automatically turns on lights and ventilation fans within the refuge space, and it triggers a broadcast alarm to alert others that the refuge is in emergency use. This feature also deters the unwanted or unauthorized access to the space in non-emergency situations. In the example embodiment, the alarm, lighting, and ventilation fans are all battery powered, and each refuge cell is stocked with emergency water and first aid supplies.

Because of the short reinforced concrete spans, the battered walls, and the structural redundancy of this system, a LadderBlock Park Refuge structure offers an extraordinary level of protection from tornadic winds and the projectiles they carry. Even if another low rise building were to collapse and fall directly on a LadderBlock Park Refuge structure, the stout concrete blocks should be able to take the blow and protect the people taking refuge inside.

Examples of Additional Block Types

Figure 29:
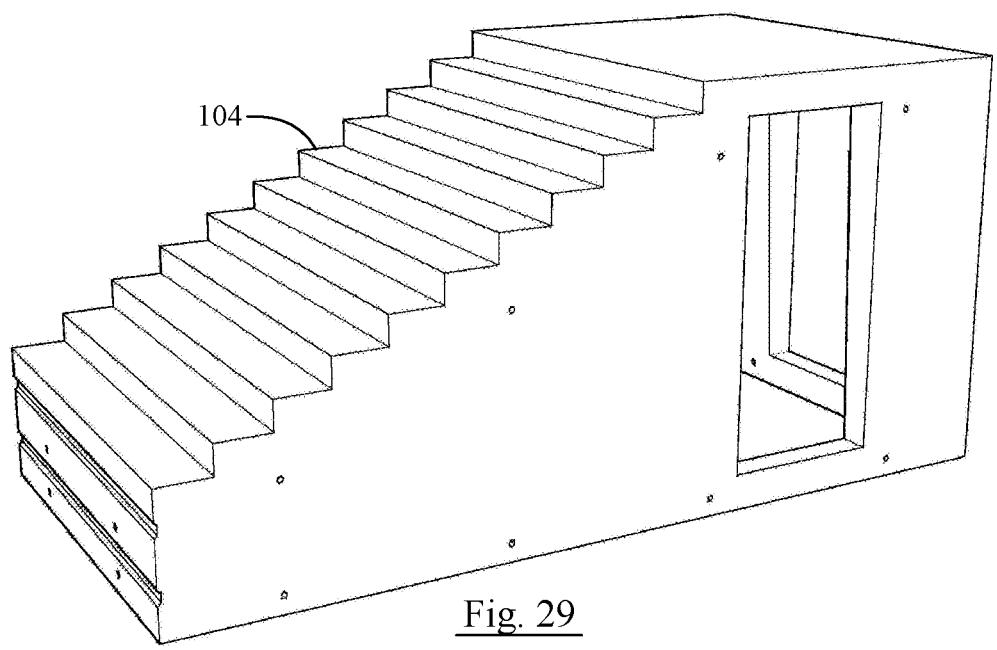
FIG. 29 is a side perspective view of an example stair block.
Figure 30:
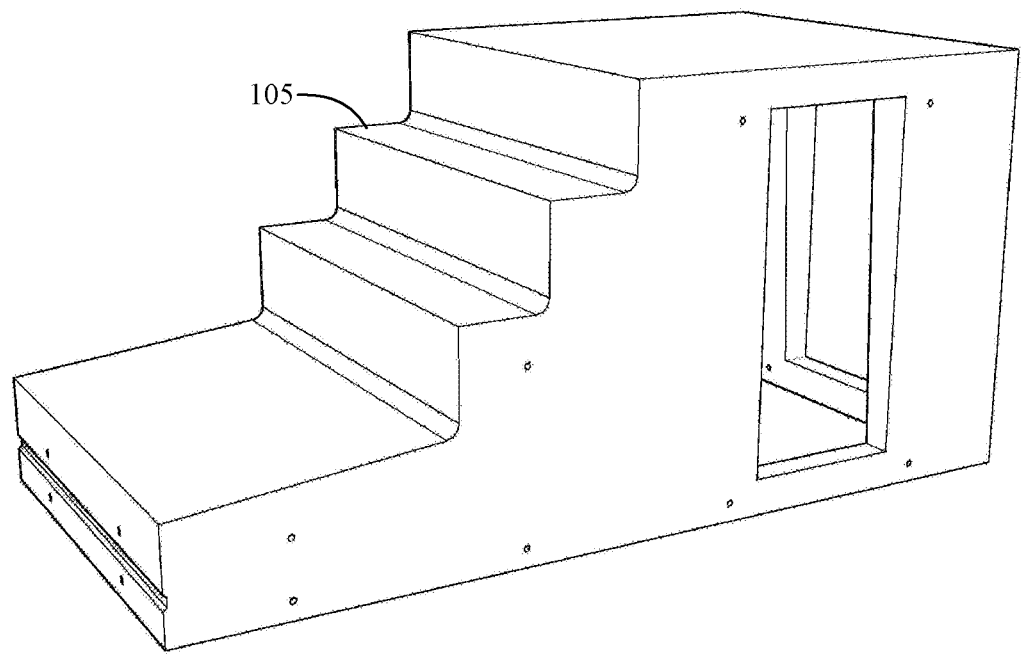
FIG. 30 is a side perspective view of an example ledge block.
Figure 31:
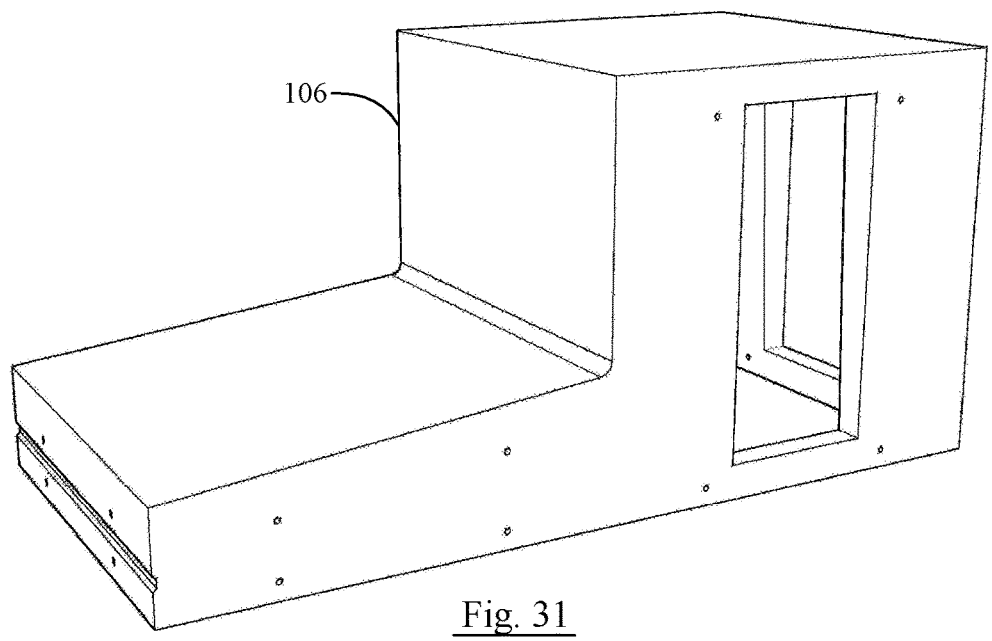
FIG. 31 is a side perspective view of an example pool block.
Figure 32:
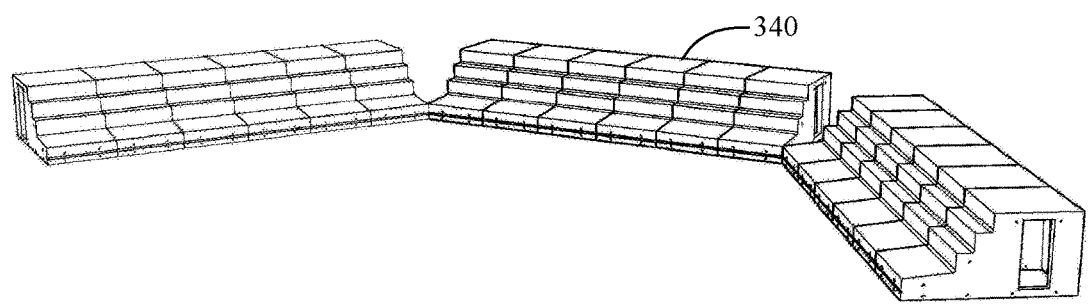
FIG. 32 is a perspective view of example amphitheater seating and refuge center formed by the assembly of a plurality of ledge blocks.
Figure 33:
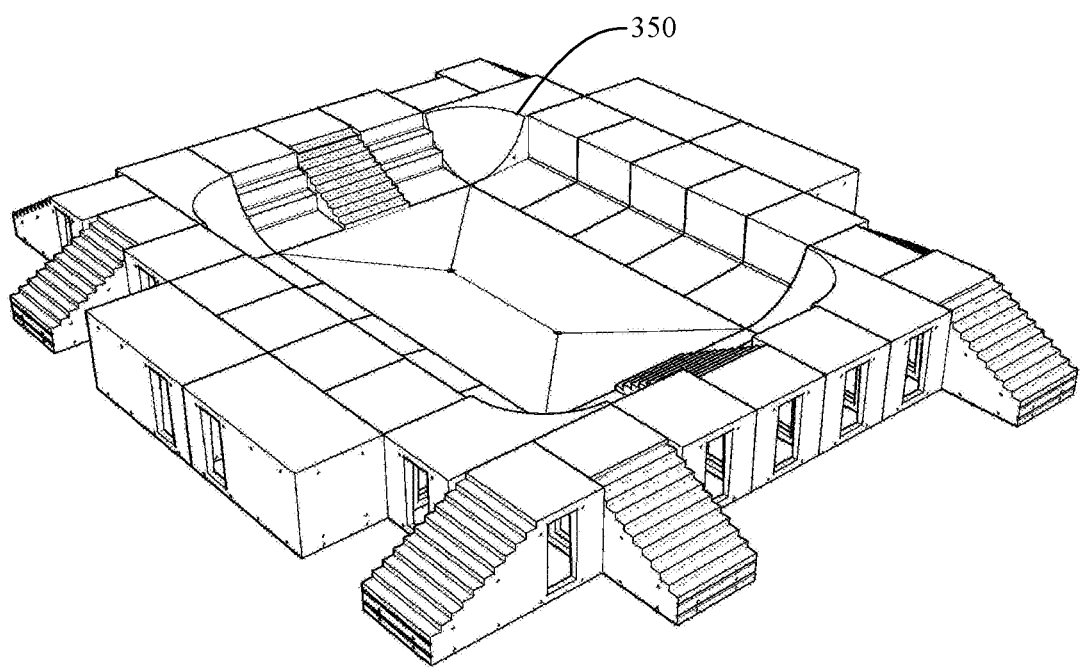
FIG. 33 is a perspective view of example swimming pool and refugee center formed by the assembly of a plurality of ledge blocks.

These geometries are representative of an unlimited number of variations that might be suitable for skating or BMX riding, or for building assembly spaces, swimming pools, or structures for a variety of other uses. Obvious variants of these blocks can include Stair Blocks 104 (FIG. 29), Ledge Blocks 105 (FIG. 30), and vertical edged Pool Blocks 106 (FIG. 31). Because of the wider profile of the dropped ceiling within the refuge cells, these three example block geometries can each accommodate twelve persons in refuge mode instead of sixteen. These blocks expand the capability of the block set to build amphitheater style assembly spaces 340 (FIG. 32), swimming pools 350 (FIG. 33), material storage facilities, or structures for a variety of other uses.

The key is that the assembly of blocks serves dual functions: above deck it serves as a recreational or otherwise useful structure on a daily basis. Below deck it serves as an economical, exceptionally stout, life saving place of refuge in a tornado. By providing two such valuable functions at a cost that is competitive with a conventional single purpose park, the LadderBlock Park Refuge building system offers communities an easy way to build places of refuge that are engineered for survival.

What is claimed is:

1. A precast module comprising
   an open bottom;
   a first side wall comprising a sloped recessed channel secondary seal line configured to capture seeping water;
   a second side wall spaced apart from the first side wall,
   a rear wall; and
   a functional top surface comprising a first portion having a planar surface and a second portion having an inclined or curved surface, such that
      at least one of the first side wall, the second side wall, and the rear wall comprises
         an access opening configured for human access, the interior space created between the first side wall, the second side wall, the rear wall, and the functional top surface is configured to serve as a refuge or storage space, and the functional top surface is configured to serve as part of a community or recreational space.

2. The precast module of claim 1 further comprising a threaded connector rod sleeve.

3. The precast module of claim 1 further comprising a bumper pad affixed to the exterior of at least one of said walls.

4. The precast module of claim 1 further comprising a plurality of shear keys cast into two or more of the first side wall, the second side wall, and the rear wall.

5. The precast module of claim 1 wherein
the first side wall further comprises embedded pipe along at least one edge.

6. A structure formed from a plurality of precast modules, the structure comprising
a first precast module comprising
a first side wall comprising a sloped recessed channel secondary seal line configured to capture seeping water,
a second side wall spaced apart from the first side wall,
a rear wall, and
a functional top surface comprising a first portion having a planar surface and a second portion having an inclined or curved surface such that
at least one of the first side wall, the second side wall, and the rear wall comprises an access opening,
the interior space created between the first side wall, the second side wall,
the rear wall, and the functional top surface is configured to serve as a refuge or storage space, and
the functional top surface is configured to serve as part of a community or recreational space, and
an open bottom;
a second precast module comprising
a first side wall,
a second side wall spaced apart from the first side wall,
a rear wall, and
a functional top surface comprising a first portion having a planar surface and a second portion having an inclined or curved surface, and
an open bottom;
such that the second precast block side wall is affixed to a first precast block side wall.

7. The structure of claim 6 further comprising
a plurality of additional precast modules, each of the plurality of additional precast modules affixed to at least one other of the plurality of additional precast modules.

8. The structure of claim 7 further comprising
a plurality of connection rods extending through sleeves provided in the plurality of additional precast modules.

9. The structure of claim 7 further comprising
a concrete ground slab.

10. The structure of claim 9 further comprising
a cast in place concrete ground slab comprising covering a bottom portion of the side and rear walls of the plurality of additional precast modules.

11. The structure of claim 7 wherein the plurality of precast modules forms a skate park, and where at least a portion of the precast module is configured to serve as a refuge center.

12. The structure of claim 7 wherein the plurality of precast modules forms a swimming pool, and where at least a portion of the precast modules is configured to serve as a refuge center.

13. The structure of claim 7 wherein the plurality of precast modules forms amphitheater seating, and where at least a portion of the precast modules is configured to serve as a refuge center.

14. A method of assembling a structure from a plurality of precast modules, the method comprising
providing a plurality of precast modules, each of the plurality of precast modules comprising
a first side wall comprising a sloped recessed channel secondary seal line configured to capture seeping water,
a second side wall spaced apart from the first side wall,
a rear wall, and
a functional top surface comprising a first portion having a planar surface and a second portion having an inclined or curved surface such that
at least one of the first side wall, the second side wall, and the rear wall comprises an access opening,
the interior space created between the first side wall, the second side wall,
the rear wall, and the functional top surface is configured to serve as a refuge or storage space, and
the functional top surface is configured to serve as part of a community or recreational space, and
an open bottom;
connecting each of the plurality of precast modules to at least one other precast module, such that the functional top surface top surfaces of the plurality of precast modules form a contiguous functional surface, and the interiors of the plurality of precast modules forms refuge or storage spaces.

* * * * *